United States Patent Office 3,794,697
Patented Feb. 26, 1974

3,794,697
MODIFIED STYRENE POLYMERS PROVIDING
IMPACT-RESISTANT MOLDED ARTICLES
Klaus Bronstert, Carlsberg, and Ernst-Guenther Kastning, deceased, by Marie-Louise Hermine Kastning, heir, Assenheim, Joachim Kurze, Dossenheim, Volker Ladenberger, Schwetzingen, and Dieter Stein, Limburgerhof, Germany; said Bronstert, said Joachim, said Volker and said Stein assignors to Badische Anilin- & Soda-Fabrik Aktiengesellschaft, Ludwigshafen, Germany
No Drawing. Continuation-in-part of abandoned application Ser. No. 22,703, Mar. 25, 1970. This application Jan. 26, 1972, Ser. No. 221,022
Claims priority, application Germany, Mar. 26, 1969,
P 19 15 369.6
Int. Cl. C08f 41/12
U.S. Cl. 260—876 R                5 Claims

ABSTRACT OF THE DISCLOSURE

Thermoplastic molding compositions comprising a mixture of two rubber-modified styrene polymers A and B. Component A consists of conventional impact-resistant polystyrene made by polymerizing styrene in the presence of a rubber component B consists of a graft polymer made by polymerizing styrene in the presence of a metallized diene polymer. The compositions have particularly high impact resistance and are therefore preferred for the manufacture of utility articles where this property is desirable.

---

This application is a continuation-in-part of application Ser. No. 22,703, filed Mar. 25, 1970 now abandoned.

It is known that the mechanical properties of impact-resistant polystyrene may be improved by modification with gel-containing cross-linked rubber. It has also been proposed to further improve the mechanical properties and the surface gloss of impact-resistant polystyrene by blending it with emulsion graft polymers of styrene on rubber or with styrene/butadiene bulk polymers. With all of these products, however, a relatively large quantity of the rubbery component must be added to achieve satisfactory impact resistance.

We have now found that thermoplastic molding compositions of improved impact resistance and improved mean breaking energy may be obtained by preparing a homogeneous blend of (A) a conventional impact-resistant polystyrene containing 3 to 12% by weight of a crosslinked butadiene or isoprene rubber and produced by polymerizing styrene or a mixture of styrene with up to 35% by weight of substituted styrenes in the presence of the rubber by free radical polymerization.

(B) from 3 to 30% by weight, based on A and B together, of a largely gel-free, non-crosslinked graft polymer produced by polymerizing from 10 to 60 parts by weight of styrene on to from 90 to 40 parts by weight of a metallized 1,3-diene polymer.

These molding compositions show satisfactory impact resistance even at relatively low rubber concentrations. They also have a high gloss and are substantially free from specks.

The component A used in the blend proposed by the invention is made by the usual methods of graft polymerizing solutions of rubber in styrene in bulk, in suspension or in the presence of a diluent. The best results are obtained when component A contains from 88 to 97% of styrene by weight and from 3 to 12% of rubber by weight. In addition to styrene, other monomers, which are copolymerizable with styrene, such as α-methyl styrene or styrenes alkylated in the nucleus, may be included in the polymerization. The comonomers are advantageously polymerized with the sytrene in the presence of the rubber in quantities ranging up to 35% by weight. By rubber we mean any of the products prepared by usual polymerization of butadiene or isoprene. Copolymers of butadiene with isoprene or copolymers of butadiene and/or isoprene with styrene, fumaric acid esters or acrylic acid esters may also be used.

Component B is made by grafting styrene on to a metallized basic structure of a rubber. The styrene may be replaced by a mixture of styrene with up to 35% of comonomer by weight. The rubber used may be a 1,3-diene homopolymer or copolymer with up to 60% by weight of comonomer, such as styrene. The metallization of the basic rubber structure to receive the graft is effected by reaction with organoalkali compounds in solution in saturated hydrocarbons such as hexane or cyclohexane at temperatures between 10° and 80° C. The principle of this metallization reaction is described by M. Schlosser in J. Organometal. Chem., 8, 9 to 16 (1967). After the metallization the polymer desirably contains from about 0.5 to about 50 metal atoms per 1,000 monomer units.

Grafting is effected in solution in hydrocarbons containing styrene or mixtures of styrene with up to 35% by weight of comonomers. The ratio of diene polymer to styrene for grafting purpose should be between 40:60 and 90:10 by weight. After removal of the solvent there remains the graft polymer B which is substantially free from gel and non-crosslinked. By "substantially free from gel and non-crosslinked" we mean that not more than 10% and preferably less than 1% of the graft polymer remains as insoluble residue when 1 part of the graft polymer is dissolved in 100 parts of toluene.

A preferred process for the manufacture of the graft polymer B comprises carrying out the polymerization of the diene, the metallization and the grafting operation all in one stage. Butadiene or a mixture of butadiene and styrene is dissolved in a hydrocarbon, polymerized with the aid of a lithiumalkyl initiator, metallized by adding the metallizing complex lithium/alkali metal alcoholate and then grafted with styrene. The resulting graft polymer consists of a linear poly-1,3-diene backbone of very narrow molecular weight distribution to which polystyrene side-chains are grafted at relatively regular intervals which side-chains are also of approximately equal length.

The components A and B are blended in the usual way at temperatures between 160° and 220° C., for example in Banbury mixers, roller mixers or extruders. The advantages to be gained by the invention are realized when the total blend of A and B contains from 3 to 30% and preferably from 5 to 10% by weight of component B.

Additives of the usual kind, such as fillers, pigments, stabilizers and lubricants, may also be included in the blend.

In the following example, the parts given are by weight. Impact strength and notched impact resistance were measured by the DIN method No. 53,453 using injection molded small standard test bars (injection molding carried out at 240° C.). Tensile strength, tear strength and elongation at break were measured by the methods DIN No. 53,455. The mean breaking energy was determined by the dart drop test on 1 mm. thick discs made by injection molding at 240° C.

EXAMPLE 1

(a) A solution of 4.8 parts of polybutadiene (of K value 85, measured in toluene at 25° C., and having a 1,2-vinyl content of 9% and a 1,4-cis content of 35%) in 85 parts of styrene and 10.5 parts of ethyl benzene is continuously polymerized at 120° to 160° C. with the addition of 0.03 part of t-dodecylmercaptan in two polymerization towers provided with stirrers. The discharged slurry has a solids content of 80% and is evaporated to dryness in vacuo at 220–230° C. The polybutadiene content of the solution graft polymer is 6%. The polymer (component A) had the following properties:

Notched impact resistance ____ 3.8 cm. kg./cm.$^2$
Impact strength _____ 60 cm. kg./cm.$^2$
Tensile strength _____ 190 kg./cm.$^2$
Mean breaking energy _____ { 9.2 cm. kg. (at + 20°).
4.8 cm. kg. (at −40°).

(b) 260 parts of butadiene are dissolved in 1,600 parts of cyclohexane, 0.09 part of n-butyllithium as initiator is added and the whole is polymerized at 70° C. for 3 hours. The resulting polybutadiene has a molecular weight of about 200,000. The solution is cooled to 35° C., and a metallizing complex comprising 0.28 part of n-butyllithium and 0.6 part of potassium-t-butanolate is mixed therewith. Metallization is complete after 3 hours, about 1.2 metal atoms being bonded to every 1,000 butadiene units in the polymer. 260 parts of styrene are then added. Grafting is complete after 1 hour. The Lithium complexes are destroyed by the addition of 1 part of methanol. After adding 1.3 parts of stearyl 4-hydroxy - 3,5 - di-t-butylphenyl propionate as stabilizer, the polymer solution is degassed in vacuo. The resulting graft polymer is completely soluble in toluene.

(c) 6 parts of component B are intimately mixed with 9 parts of component A and 4 parts of butyl stearate as lubricant at 180° to 200° C. for two minutes in a twin screw extruder. The resulting blend contains 6% of blending component B and a total of 8.4% of rubber.

The properties of the blend are as follows:

Notched impact resistance __ 7.9 cm. kg./cm.$^2$.
Impact strength _____ (no breakage).
Tensile strength _____ 176 kg./cm.$^2$.
Tear strength _____ 180 kg./cm.$^2$.
Elongation at break _____ 52%.
Mean breaking energy _____ { 56 cm. kg. (at +20° C.).
20 cm. kg. ) at −40° C.).

EXAMPLE 2

Example 1 is repeated except that for the preparation of the backbone of component B there is used a mixture of 60 parts of butadiene and 40 parts of styrene, which are copolymerized together. The metallization is carried out during 20 minutes at 38° C.

Properties:

Notched impact strength _ 8.0 cm. kg./cm.$^2$.
Impact resistance _____ 58 cm. kg./cm.$^2$.
Tensile strength _____ 182 kg./cm.$^2$.
Tear strength _____ 189 kg./cm.$^2$.
Elongation at break ____ 47%.
Mean breaking energy __ { 50 cm. kg. (at +20° C.).
13 cm. kg. (at −40° C.).

EXAMPLE 3

Example 1 is repeated except that component B contains as backbone a copolymer consisting of 99 parts of butadiene and 1 part of styrene. Metallization is carried out for 20 minutes at 30° C.

Properties:

Notched impact strength _ 7.5 cm. kg./cm.$^2$.
Impact resistance _____ 58 cm. kg./cm.$^2$. (no breakage).
Tensile strength _____ 178 kg./cm.$^2$.
Tear strength _____ 185 kg./cm.$^2$.
Elongation at break _____ 50%.
Mean breaking energy __ { 55 cm. kg. (at +20° C.).
18 cm./kg. (at −40° C.).

EXAMPLE 4

Example 1 is repeated except that 84 parts of component A are blended with 4 parts of butyl stearate and 12 parts of component B, which is the same graft polymer as used in Example 3. The blend contains a total of 17% rubber.

Properties:

Notched impact strength _ 12.0 cm. kg./cm.$^2$.
Impact resistance _____ 47 cm. kg./cm.$^2$ (no breakage).
Tensile strength _____ 147 kg./cm.$^2$.
Tear strength _____ 148 kg./cm.$^2$.
Elongation at break ____ 65%.
Mean breaking energy __ { 68 cm. kg. (at +20° C.).
25 cm. kg. (at −40° C.).

EXAMPLE 5

Example 1 is repeated except that 78 parts of component A are blended with 4 parts of butyl stearate and 18 parts of component B, which is the same graft polymer as used in Example 3. The blend contains a total of 22.7% rubber.

Properties:

Notched impact strength _ 15.0 cm. kg./cm.$^2$.
Impact resistance _____ 43 cm. kg./cm.$^2$ (no breakage).
Tensile strength _____ 132 kg./cm.$^2$.
Tear strength _____ 123 kg./cm.$^2$.
Elongation at break ____ 78%.
Mean breaking energy __ { 80–90 cm. kg. (folded, at +20° C.).
28 cm. kg. (at −40° C.).

EXAMPLE 6

Component B contains as backbone a copolymer consisting of 99 parts of butadiene and 1 part of styrene. Metallization is then effected for 20 minutes at 30° C. followed by the addition of 25 parts of styrene (=20% styrene based on the graft polymer). Component B is worked up as described in Example 1b.

Blending is carried out as described in Example 1c. The resulting blend contains 6% of component B and a total of 8.4% of rubber.

Properties:

Notched impact strength _ 7.8 cm. kg./cm.$^2$.
Impact resistance _____ 55 cm. kg./cm.$^2$ (no breakage).
Tensile strength _____ 175 kg./cm.$^2$.
Tear strength _____ 180 kg./cm.$^2$.
Elongation at break ____ 55%.
Mean breaking energy __ { 55 cm. kg. (at +20° C.).
20 cm. kg. (at −40° C.).

We claim:
1. A thermoplastic molding composition which comprises: a homogeneous blend of
   (A) a conventional impact-resistant polystyrene made by polymerizing styrene in the presence of from 3 to 12% by weight of a rubbery butadiene or isoprene polymer by free radical polymerization, and
   (B) from 3 to 30% by weight, based on the blend A+B of a substantially gel-free and non-crosslinked graft polymer obtained by grafting from 10 to 60 parts of styrene on to 90 to 40 parts of a metallized diene polymer.
2. Molding compositions as in claim 1 containing from 5 to 10% by weight of component B.

3. Molding compositions as in claim 1 wherein component A is one made by polymerizing from 97 to 88% by weight of styrene in the presence of from 3 to 12% by weight of polybutadiene and in the presence of a hydrocarbon solvent.

4. Molding compositions as in claim 1 wherein component B is one made by grafting styrene to a diene polymer containing from 0.5 to 50 atoms of metal per 1,000 monomer units.

5. Molding compositions as in claim 1 wherein component B is one made by polymerizing butadiene and a lithiumalkyl catalyst in a hydrocarbon solvent, adding a metallizing complex consisting of lithiumalkyl/alkali metal alcoholate and grafting styrene to the product.

References Cited

UNITED STATES PATENTS

| | | | |
|---|---|---|---|
| 3,492,369 | 1/1970 | Naylor | 260—879 |
| 3,311,675 | 3/1967 | Doak et al. | 260—880 |
| 3,703,566 | 11/1972 | Duck et al. | 260—878 R |
| 3,449,469 | 6/1969 | Maringer | 260—876 R |

JOHN C. BLEUTGE, Primary Examiner

C. J. SECCURO, Assistant Examiner

U.S. Cl. X.R.

260—877, 880 R, 31.2 MR, 45.85